T. BRADFORD.
GEARING FOR REED MAKING MACHINES.
APPLICATION FILED AUG. 18, 1909.
950,431.
Patented Feb. 22, 1910.
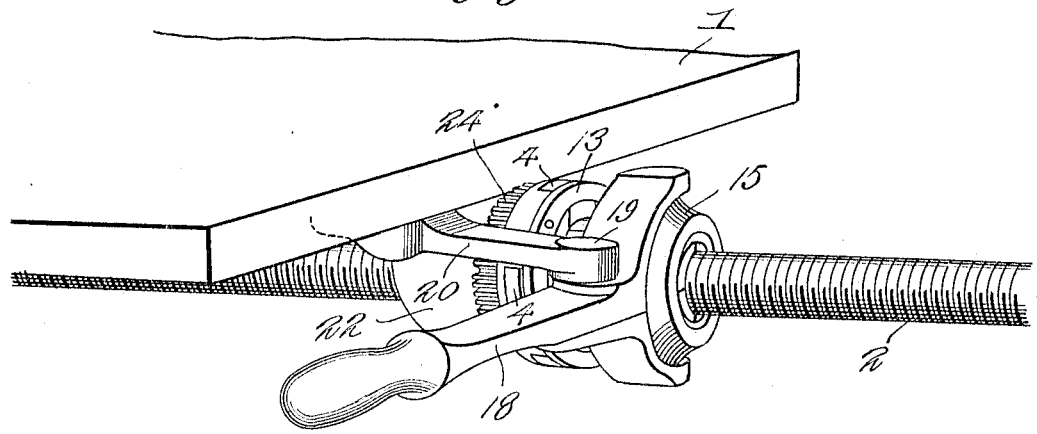
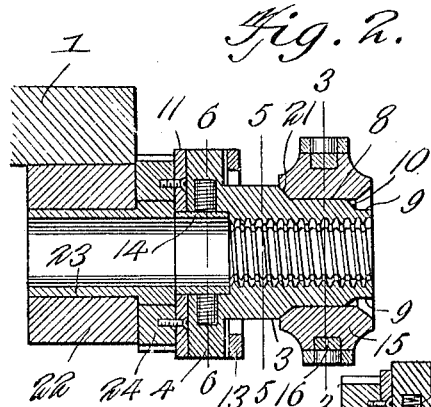
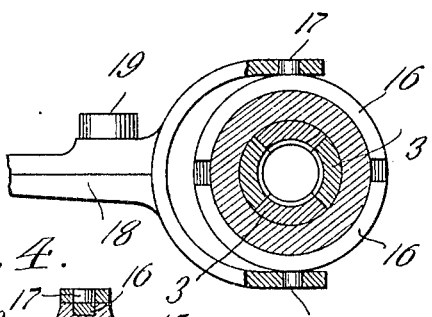
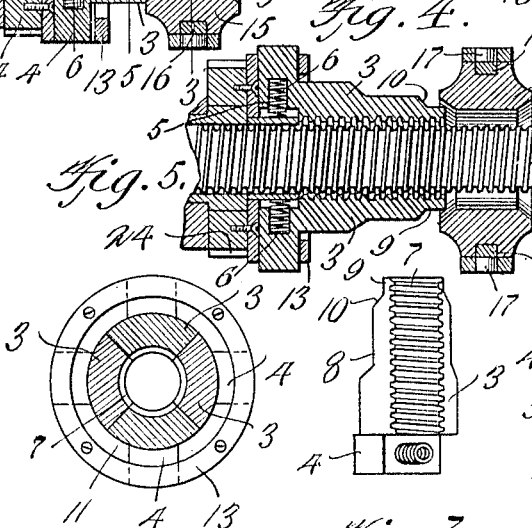
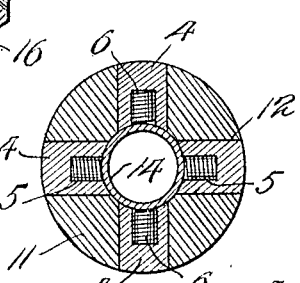
Witnesses
Frank B. Hoffman
V. B. Hillyard
Inventor
Thomas Bradford
By Victor J. Evans
Attorney

UNITED STATES PATENT OFFICE.

THOMAS BRADFORD, OF DANIELSON, CONNECTICUT.

GEARING FOR REED-MAKING MACHINES.

950,431.	Specification of Letters Patent.	Patented Feb. 22, 1910.

Application filed August 18, 1909. Serial No. 513,548.

*To all whom it may concern:*

Be it known that I, THOMAS BRADFORD, a citizen of the United States, residing at Danielson, in the county of Windham and State of Connecticut, have invented new and useful Improvements in Gearing for Reed-Making Machines, of which the following is a specification.

The present invention appertains to means for transmitting motion from the rotary shaft to the reciprocating part and embodying a feed nut and a feed screw, the purpose being to provide for the quick return of the reciprocating part after the same has advanced to the required position.

The invention is particularly designed for reed machines whereby the carriage, provided with the operating mechanism, may be quickly returned to the starting or given position.

The invention contemplates a sectional feed nut of peculiar construction mounted upon and adapted to coöperate with a feed screw, a carrier for the feed nut, means for expanding and contracting the feed nut, and adjunctive parts whereby the invention is especially adapted for the particular application designed.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a perspective view of a portion of the carriage of a reeding machine, showing the feed screw, feed nut, and coöperating parts embodying the invention. Fig. 2 is a vertical central longitudinal section of the parts illustrated in Fig. 1, the feed screw being omitted. Fig. 3 is a transverse section on the line 3—3 of Fig. 2. Fig. 4 is a view similar to Fig. 2, showing the relation of the parts when the confining ring is moved outward and the feed nut is expanded so as to clear the thread of the feed screw. Fig. 5 is a section on the line 5—5 of Fig. 2, looking to the left. Fig. 6 is a section on the line 6—6 of Fig. 2, looking to the right. Fig. 7 is a perspective view of one of the nut sections.

Corresponding and like parts are referred to in the following description, and in all the views of the drawings, by the same reference characters.

The carriage 1 may be of any construction, according to the machine for which the invention is adapted, and is mounted to receive a reciprocating movement. A feed screw 2 may be mounted in any manner and is stationary and consists of a threaded shaft or rod. A feed nut is of sectional formation, four sections being provided, as indicated most clearly in Figs. 3, 5, and 6. Each section is constructed alike and comprises a body portion 3 and a head 4, the latter projecting outwardly from the body at a right angle and having an opening 5 in which is fitted an expansible, helical spring 6 for separating the sections of the feed nut, when released from the confining ring. The body portion of the feed nut is provided upon its inner face with screw threads 7 to match the screw threads of the feed screw 2. The body portion of each section of the feed nut is stepped upon its outer side, as indicated at 8 and 9, and an inclined portion 10 is provided between the stepped portions 8 and 9, forming a cam which coöperates with a corresponding inclined or cam portion of the confining ring so as to contract the feed nut and cause the sections to come close together about the feed screw, whereby the threaded sections 7 match with and engage the screw threads of the feed screw so that, in the retention of the feed nut, the carriage 1 or like part is positively moved.

A carrier 11 receives and supports the feed nut sections and consists of a ring having radial grooves 12 forming seats or ways in which the heads 4 of the feed nut sections are slidably mounted. A ring 13 is secured to the outer face of the carrier 11 and extends across the open sides of the grooves or ways 12, so as to retain the heads of the feed nut sections in proper place. The ring 13 is of such diameter as to admit of the spreading of the feed nut sections to insure the disengagement of their screw thread sections from the screw thread of the screw. This is clearly indicated in Fig. 4. A ring 14 is located within the opening of the carrier 11 and within the headed portion of the feed nut sections and supports the inner ends of the expansible springs 6. The ring 14 is of a size to fit loosely upon the feed screw and admit of the ring 14 moving freely thereon.

The confining ring 15 has an annular groove in its outer surface to receive ring segments 16 which have centrally disposed trunnions 17 to engage the fork members of a shipper lever 18, which is mounted at 19 upon a bracket arm 20 extended outward from the carriage 1. The confining ring 15, when mounted upon the stepped portions 8 of the feed nut sections, holds the latter contracted about the feed screw with the screw thread sections 7 in engagement with the screw threads of said screw. When the confining ring is moved outward upon the stepped portions 8 and 9 of the feed nut sections, the latter are pressed outward by the spring 6, thereby causing their screw threaded sections 7 to clear the screw threads of the feed screw 2, as indicated most clearly in Fig. 4. The opening of the confining ring is flared at its inner end, as indicated at 21, forms a cam portion and coöperates with the inclined or cam portions 10 of the feed nut sections, so as to contract said sections about the feed screw when the outer edge of the shipper lever 18 is pressed outward or away from the carriage 1. When the outer end of the shipper lever 18 is pressed inward or toward the carriage 1, the ring is moved outward upon the feed nut to a position to register with the contracted portion represented by the stepped portions 9, thereby admitting of the sections of the feed nut being moved outward by the expanding of the spring 6, so as to clear the feed screw, whereby the carriage may be moved rapidly to the desired position either outward or inward.

The carriage 1 is provided with a bearing 22 in which is mounted a sleeve 23 to which is secured a gear wheel 24, said gear wheel, in turn, being secured to the carrier 11, so as to rotate therewith. The gear wheel 24 is adapted to be driven from a convenient part of the operating mechanism mounted upon the carriage, thereby imparting a corresponding rotary movement to the carrier 11, which, in turn, draws the feed nut, which latter, coöperating with the stationary screw 2, imparts a rectilinear movement to the carriage 1. When the confining member 15 is moved to release the feed nut sections, the latter fly outward under the action of the spring 6 and release the feed screw, thereby admitting of the carriage being quickly returned or moved to any desired position in its travel.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new is:—

1. In combination with a feed screw and a reciprocating element, a sectional feed nut mounted upon the reciprocating element and prevented from turning thereby and coöperating with the feed screw and comprising stepped portions and having a cam portion between the stepped portions, a carrier for holding the sections of the feed nut in proper position, means for moving the sections of the feed nut outward, and a confining ring slidable upon the feed nut and having its opening enlarged at one end to form a cam portion to engage with the cam portions of the feed nut, when moving the confining ring upon said feed nut.

2. In combination with a feed screw and a reciprocating element, a sectional feed nut mounted upon the reciprocating element and prevented from turning thereby, a carrier having radial grooves to receive parts of the feed nut sections, a ring secured to the carrier and closing the outer sides of the grooves thereof to retain the feed nut sections in proper position and to limit their outward movement, means for spreading the sections of the feed nut and means for contracting the feed nut sections to close the same about the feed screw.

3. In combination with a feed screw and a reciprocating element, a sectional feed nut mounted upon the reciprocating element and prevented from turning thereby and adapted to coöperate with the feed screw, each section comprising a head and a body portion, a carrier having radial grooves to receive the heads of the feed nut sections, a ring secured to the carrier for retaining the feed nut sections in place and limiting their outward movement, a ring arranged within the carrier and the headed portion of the feed nut sections, springs arranged within the headed portions of the feed nut sections and supported upon the inner ring, and means for contracting the feed nut sections about the feed screw.

4. In combination with a feed screw and a reciprocating element, a sleeve mounted to move freely upon the feed screw and connected with said reciprocating element, a gear wheel fastened to said sleeve, a carrier connected with said gear wheel, a sectional nut mounted upon the carrier and adapted to contract and expand, and means coöperating with said feed nut to effect contraction and expansion thereof.

5. In combination a feed screw, a reciprocating element provided with a bearing, a sleeve mounted in said bearing and loose upon the feed screw, a gear wheel fast to said sleeve, a carrier fast to said gear wheel and provided with radial grooves, a sectional feed nut, each section comprising a body and a head, the latter having an opening extending inward from the inner end, said feed nut sections having their heads mounted in the radial grooves of the carrier, a ring secured to the side of the carrier to retain the feed nut sections in place and limit their outward movement, a ring located within the carrier and within the headed portions of the feed nut sections, springs located in the openings formed in the heads of the feed nut sections and retained in place by said ring, and a confining ring for contracting the feed nut sections.

In testimony whereof I affix my signature in presence of two witnesses.

THOMAS BRADFORD.

Witnesses:
 OLIVER E. GETTY,
 WILLIAM H. BARRON.